May 3, 1927.
A. KATZINGER
1,627,542
REENFORCED BAKING PAN
Filed Sept. 18, 1926
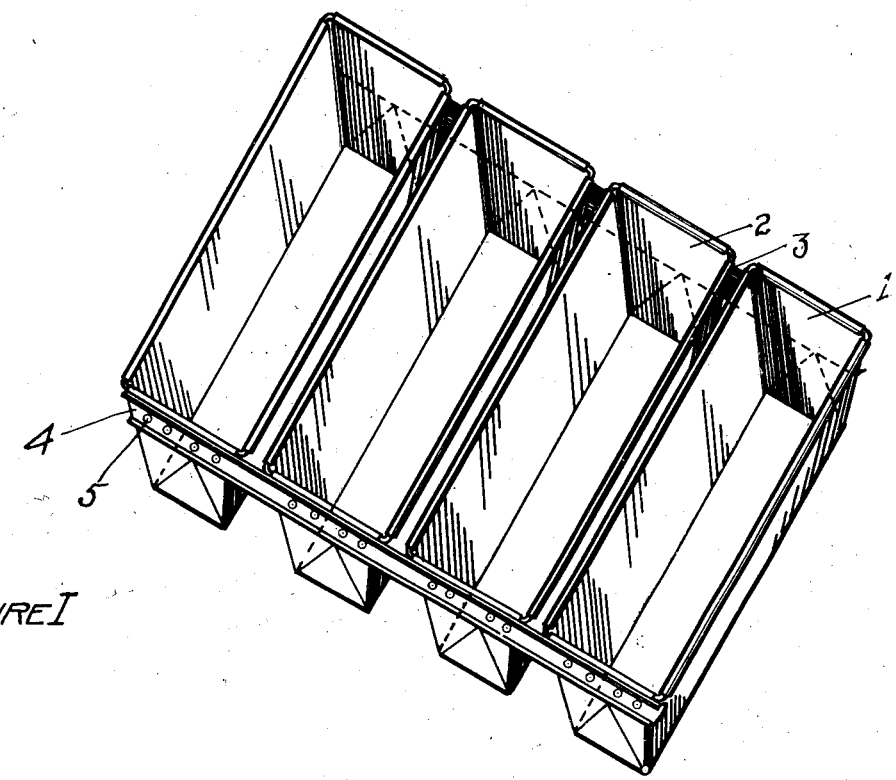
FIGURE I
FIGURE II
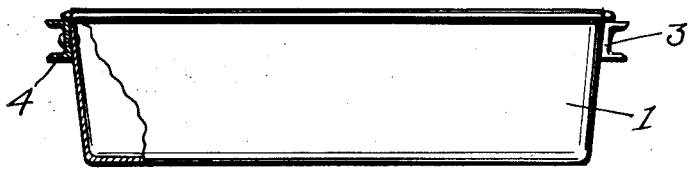
ARTHUR KATZINGER,
INVENTOR.
ATTORNEY.

Patented May 3, 1927.

1,627,542

UNITED STATES PATENT OFFICE.

ARTHUR KATZINGER, OF CHICAGO, ILLINOIS.

REENFORCED BAKING PAN.

Application filed September 18, 1926. Serial No. 136,312.

This invention relates to pans used for baking bread, cake and other materials used ordinarily by wholesale bakeries, although obviously the same construction may be used for domestic cooking purposes and for other uses some of which are mentioned herein.

The object of this invention is to provide a strong, durable and simple sanitary baking pan with a maximum of strength and a minimum of weight. Other objects will be apparent from the description and drawing attached hereto.

It is well known that in the use of multiple sets of baking pans strapped together, the depreciation is usually very heavy owing to the severe usage or abuse to which the pans are subjected. For example, in handling, washing, placing in the oven, moving from the oven and moving about the plant pans are frequently thrown, dropped, hammered, stepped on and otherwise mistreated. A group of pans fastened together by strapping or other means are subjected to severe strains under these and other service conditions. In some cases, the pans themselves are bent, broken or deformed while in other cases the group of pans are deformed by the bending or distortion of the straps or other means for attaching the group together. This invention provides among other things for strongly and firmly attaching the various pans together in such a way that the group will withstand the maximum amount of abuse. The strapping also serves in a measure to protect the individual pans against damage.

Referring to the drawings Figure I shows a perspective view of a set of four pans attached together in a unit in accordance with my invention. Figure II shows a side elevation illustrating more clearly the details of the structure of my invention.

(1) indicates a typical pan which I have shown constructed in the usual manner but may be of any desired form or construction without departing from the spirit of this invention. (2) shows an adjacent pan of similar construction. (3) and (4) show a strapping means which in the case of my invention is a light channel or structural shape riveted to pan (1) by a series of rivets (5) and to the succeeding pan in a similar manner.

I prefer to place the rivets between the folded portion of the pan and the outside end of the pan and force the rivets through the structural shape (4) so that the inside of the pan is free from rivets. If desired I may, of course, place the rivets entirely through the folds, the end of the pan and the structural shape (4).

I am aware that in pans of this type, it has been customary to employ wires, rods and flat straps to hold a group of pans together. In such a case the rod or strap has relatively small strength in itself and it is necessary to reenforce the pans by attaching them together at other points. It the case of the structure which I have invented the channel section or other structural shape has so much strength that no other reenforcements or support is necessary. As the edge of the channel extends an appreciable distance beyond the ends of the pans, thus giving the pans appreciable protection from blows on the end by other pans, this construction also protects the pans in case they are pushed against the side of the oven or any other rigid members. The protection is, of course, obtained quite largely by the stiff edges of the channel which project beyond the ends of the pan and are, therefore, the first portions to come into contact with any other object.

It will, of course, be evident that the use of channels as shown provides excellent protection, but I may also use angles, T-sections or other special shapes of structural steel.

Having now fully described my invention what I claim as new and wish to secure by Letters Patent in the United States is as follows:

A series of baking pans having a reenforcing wire extending around the top edge of each of said pans, said pans being arranged side by side and fastened into a single unit by means of two strips riveted respectively to each of the ends of each pan, said strips consisting of a portion in contact with the ends of said pans, and another integral stiffening portion bent on an angle with said first portion and extending outward beyond and protecting the ends of said pans.

ARTHUR KATZINGER.